United States Patent [19]

Antonelli

[11] 4,424,296

[45] Jan. 3, 1984

[54] BLENDS OF LOW MOLECULAR WEIGHT HYDROXY-TERMINATED POLYESTERS AND COATINGS BASED ON THESE BLENDS

[75] Inventor: Joseph A. Antonelli, Riverton, N.J.

[73] Assignee: E. I. Du Pont de Nemours & Co., Wilmington, Del.

[21] Appl. No.: 947,183

[22] Filed: Sep. 29, 1978

Related U.S. Application Data

[63] Continuation-in-part of Ser. No. 704,366, Jul. 12, 1976, abandoned.

[51] Int. Cl.³ .......................... C08L 67/06; C08K 3/20
[52] U.S. Cl. .................................... 524/539; 524/497; 525/440; 525/441; 525/444
[58] Field of Search ................. 260/850; 525/444, 441, 525/440; 524/539, 497

[56] References Cited

U.S. PATENT DOCUMENTS

| | | | |
|---|---|---|---|
| 2,915,418 | 12/1959 | Wolfrom | 117/140 |
| 3,296,211 | 1/1967 | Winkler et al. | 260/75 |
| 3,310,512 | 3/1967 | Curtice | 260/29.4 |
| 3,491,066 | 1/1970 | Petropoulos | 260/75 |
| 3,804,920 | 4/1974 | Cunningham et al. | 260/850 |
| 3,819,757 | 6/1974 | Dorffel et al. | 260/850 |
| 3,852,375 | 12/1974 | Biethan et al. | 524/296 |
| 3,857,817 | 12/1974 | Henshaw et al. | 260/67.6 R |
| 3,893,959 | 7/1975 | Layman | 260/22 D |

*Primary Examiner*—Theodore E. Pertilla

[57] ABSTRACT

Blends of low molecular weight hydroxy-terminated polyesters, based on diols, such as 2,2,4-trimethyl-1,3-pentane diol, and diacids or their esters, such as isophthalic acid, and methyl esters of short chain aliphatic diacids, are provided. The blends can be crosslinked with conventional crosslinking agents such as nitrogen resins or polyisocyanates. The formulated coatings have high solids content of relatively low viscosities and are useful on e.g. metallic substrates forming, upon curing, coatings having excellent tensile strength, hardness, and resistance to staining, weathering, and corrosive conditions.

18 Claims, No Drawings

BLENDS OF LOW MOLECULAR WEIGHT HYDROXY-TERMINATED POLYESTERS AND COATINGS BASED ON THESE BLENDS

CROSS REFERENCE TO RELATED APPLICATIONS

This application is a continuation-in-part of my copending application Ser. No. 704,366 filed July 12, 1976 now abandoned.

BACKGROUND OF THE INVENTION

1. Field of Invention

This invention is related to low molecular weight polyesters and coatings based thereon and particularly to blends of low molecular weight hydroxy-terminated polyesters and thermosetting coating compositions prepared therefrom.

2. Description of Prior Art

Polyesters are well known in the prior art. Their preparation and utilization in a large variety of coating applications have been amply documented. The prior art is replete with polyesters of various end groups and of widely varying molecular weights.

U.S. Pat. No. 3,296,211, issued Jan. 3, 1967 to J. Winkler, et al. discloses hydroxy-terminated polyesters prepared from a mixture of di-primary and primary-secondary diols and aliphatic diacids. Such compositions are not commonly useful as coatings and suffer from the disadvantage that during their preparation the components link up in a random fashion and therefore it is difficult to control final properties, such as stain and salt spray resistance.

U.S. Pat. No. 3,819,757, issued June 25, 1974 to J. Dorffel, et al., discloses coating compositions containing low molecular weight hydroxy-terminated polyesters which require maleic or oxalic acids for curing. Again, a possible disadvantage of these compositions resides in the use of mixtures of different diols and mixtures of different diacids.

Conventional coating compositions comprise one or more film-forming constituents which, as the name implies, are primarily responsible for the formation of the coating film on the substrate. In the case of thermosetting compositions, it is common to select as the film-forming constituents of the compositions, blends of materials, at least one of which is polymeric and has a typical number average molecular weight of at least about 2,000, which co-react during the curing process to form a crosslinked polymeric film of very high molecular weight. For example, suitable known compositions of this type are blends of alkyd resins with melamine-formaldehyde or urea-formaldehyde resins. The resins themselves are normally solid or semi-solid at ambient temperature and hence in order to formulate coating compositions which are sufficiently fluid to be applied to substrates by conventional means, the compositions usually include solvents for the resins, to lower the composition viscosity. A typical coating composition of this type can contain 40 percent or more by weight of solvent, usually a volatile organic liquid, which must be removed during the curing process, thus presenting a waste-disposal and potential atmospheric pollution problem. U.S. Pat. No. 3,857,817, issued Dec. 31, 1974 to B. C. Henshaw, et al., discloses high solids coating compositions based on low molecular weight polyesters and thereby obviating the need for the inclusion of large amounts of organic solvents. However, in Example 10 of this patent it is pointed out that any deviation from the indicated structures results in films having markedly inferior properties.

U.S. Pat. No. 3,893,959, issued July 8, 1975 to R. E. Layman, discloses alkyd resins which are polyesters of rather complex compositions. A mixture of mono-, di-, and tri-carboxylic acids is utilized. The dicarboxylic acid component is made up of at least three different varieties, among which are the phthalic acids and, optionally, aliphatic dicarboxylic acids. The diol component comprises at least two kinds, one of which is a hindered diol such as 2,2,4-trimethyl-1,3-pentane diol. Such compositions suffer from the above described disadvantage of randomness and are too viscous for high solids applications.

SUMMARY OF THE INVENTION

According to the present invention there is provided a blend of hydroxy-terminated polyesters consisting essentially of:

(A) 10–90 parts by weight, based on the weight of the blend, of a polyester of the following structure:

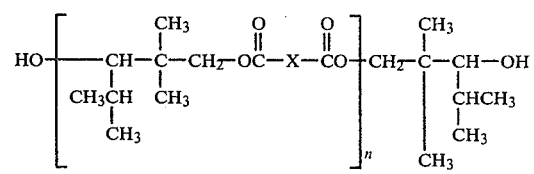

or the isomeric ester through the secondary hydroxyl group, wherein X=—CH=CH—,

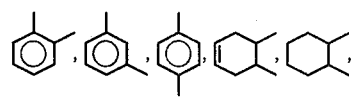

and wherein n=0–10 with at least 70% by weight of n=0–3 and provided that only a maximum of 25% by weight of n=0;

(B) 90–10 parts by weight, based on the weight of the blend, of a polyester of the following general structure:

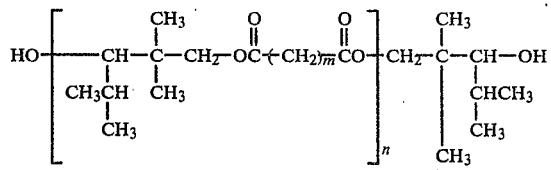

or the isometric ester through the secondary hydroxyl group, wherein n=0–10 with at least 65% by weight of n=0–3 and provided that only a maximum of 25% by weight of n=0 and wherein m=2–12 with m=2–4 predominating; and Wherein polyesters A and B have a number average molecular weight not exceeding about 1,000 determined by gel permeation chromatography using a polypropylene glycol standard.

According to the present invention there is further provided a high solids coating composition consisting essentially of:

(A) 30–80 parts by weight, based on the weight of (A) plus (B), of a blend of hydroxy-terminated polyesters described above; and (B) 70–20 parts by weight, based on the weight of (A) plus (B), of a nitrogen resin crosslinking agent or a polyisocyanate.

It is also contemplated that the coating composition of this invention can contain rheology control agents, pigments, dispersants, adhesion promoters, and other adjuvants.

DESCRIPTION OF THE INVENTION

The blend of low molecular weight hydroxy-terminated polyesters of this invention comprises polyesters based on 2,2,4-trimethyl-1,3pentane diol (TMPD) as the diol component.

It has been found unexpectedly that the exact nature of the diol can be determinative of the properties of the polyester blend of this invention. When neopentyl glycol was used in place of TMPD, the polyester components were of very high viscosity, partially solid at room temperature.

To obtain the two polyester components of the blend, TMPD is reacted separately with iso-phthalic acid (IPA) or its esters such as dimethyl iso-phthalate, other phthalic acids and their esters, maleic acid and its esters or tetrahydrophthalic acid, its anhydride or esters, cyclohexane-1,2-dicarboxylic acid, its anhydride or esters, and the isomeric naphthalene dicarboxylic acids, their esters or anhydrides and with an aliphatic dicarboxylic acid, its esters or mixtures thereof. The aliphatic dicarboxylic acid is of the general formula $HOOC-(CH_2)_m-COOH$, where m is generally 2–4, although m=1 or 4–12 is also possible. In one preferred composition, a mixture of dicarboxylic acids or their esters is utilized, the mixture containing succinic, glutaric, and adipic acids. The choice of a specific ratio of aliphatic esters can depend on the final polyester property desired, such as flexibility or softness. In one preferred composition this ratio is 1:2:1 by weight of succinic, glutaric, adipic acids.

During the preparation of the two components of the blend of polyesters, the starting diol component, TMPD, can and probably does react at either of its two hydroxyl groups. Although the polyester components are represented by the following two formulae, it is contemplated that the isomeric products, through the secondary hydroxyl groups, can also be present:

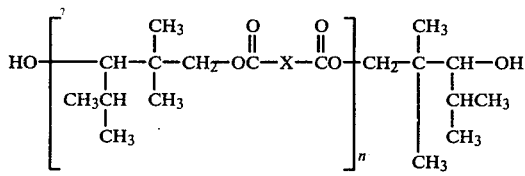

where $X = -CH=CH-$,

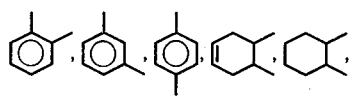

and n=0–10, and

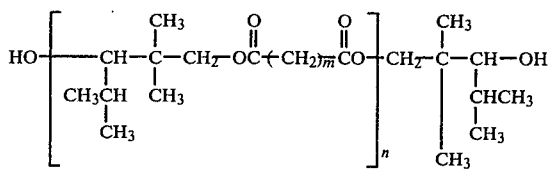

where n=0–10 and m=2–12. and provided that for each of the above polyester only a maximum of 25% by weight of n=0.

For optimum final coating properties it has been found that is is important to control not only the composition of each component of the blend and their ratios to each other but also the molecular weight of each of the components of the blend. The average number average molecular weight must not exceed approximately 1,000. It is of course recognized by the skilled workers, that a polyester itself is a mixture of different molecular weight species, that is the value of n in the above structures can vary. It is preferred that values of n be 0, 1, 2 or 3, although there are usually obtained smaller amounts of higher molecular weight species also, n up to and including 10. However, only a maximum of 25% by weight of n can be 0. In some typical reactions for the preparation of the components of the blend of polyesters of this invention, the following data show the molecular weight species obtained by gel permeation chromatography utilizing a polypropylene glycol standard and the corresponding values of n. For the TMPD/IPA reactions a molar ratio of 2.1:1 of the reactants is utilized, for the TMPD/ aliphatic carboxylic methyl esters (dimethyl succinate:dimethyl glutarate:dimethyl adipate = 1:2:1, by weight) reactions the molar ratio is 1.8:1.

| TMPD/IPA | | | | |
|---|---|---|---|---|
| run #1: | | | | |
| molecular weight: | 150 | 410 | 680 | 980–1040 (shoulder) |
| n: | 0 | 1 | 2 | 3 |
| run #2: | | | | |
| molecular weight: | 140 | 380 | 640 | 910–970 (shoulder) |
| n: | 0 | 1 | 2 | 3 |

It is contemplated that, on the average, at least 70% by weight of this polyester component is n=3 or less. Preferably, about 10–20% by weight of n=0.

| TMPD/aliphatic: | | | | |
|---|---|---|---|---|
| run #1: | | | | |
| molecular weight: | 142 | 230 | 390 | 650 | 950 |
| n: | 0 | (half-ester) | 1 | 2 | 3 |
| run #2: | | | | |
| molecular weight: | 143 | 220 | 390 | 640 | 940 |
| n: | 0 | (half-ester) | 1 | 2 | 3 |

It is contemplated that, on the average, at least 65% by weight of this polyester component is n=3 or less. Preferably, about 10–22% by weight of n=0.

For best overall properties for the coating composition of this invention a low final acid number is desired for the polyester components of the blend. The acid number is usually 40 or below but it is preferred that the acid number not exceed 12. The acid number is the number of milligrams of potassium hydroxide required to neutralize a 1-gram sample of the polyester.

The individual polyester components of the blend can be present in the relative weight ratios of from 10:90 to 90:10 and can also be in a weight ratio of 80:20 to 20:80. It is preferred for optimum final coating properties that the ratio of the polyester containing the aromatic dicarboxylic acid moiety to the polyester containing the aliphatic dicarboxylic acid moiety be from 80:20 to 40:60 and most preferably 65:35.

The blend of hydroxy-terminated polyesters of this invention can comprise 30-80% by weight of the film-forming composition and preferably 50-70%. The relative amounts of the polyester blend to the crosslinking agent, the total comprising the film-forming composition, can depend on the type of crosslinking agent utilized and on the amount and type of catalyst to be included.

The formulated high solids coating compositions of this invention can be applied to a substrate at a solids content of approximately 95% by weight. A characteristic property of these compositions is the pronounced lowering of viscosity with only a slight increase in temperature from ambient. This property can be utilized to enhance, e.g., the spray atomization during application. In contrast, conventional coating compositions usually exhibit a more linear lowering of viscosity with increased temperatures.

The blend of hydroxy-terminated polyesters of this invention, when combined with a crosslinking agent such as a nitrogen resin crosslinking agent or a polyisocyanate, from the coating composition of this invention.

The nitrogen resin crosslinking agents are well known in the art. They are the alkylated products of amino resins, the latter prepared by the condensations of at least one aldehyde with at least one of urea, N,N'-ethyleneurea, dicyandiamide, and aminotriazines such as melamines and guanamines. Among the aldehydes that are suitable are formaldehyde, revertable polymers thereof such as paraformaldehyde, acetaldehyde, crotonaldehyde, and acrolein. Preferred are formaldehyde and revertable polymers thereof. The amino-resins are alkylated with at least one and up to six alkanol molecules containing 1 to 6 carbon atoms. The alkanols can be straight chain, branched, cyclic or mixtures thereof. Among preferred members of this class are the methylated melamine-formaldehyde resins such as hexamethoxymethylmelamine. These liquid crosslinking agents have substantially 100% non-volatile content as measured by the foil method at 45° C. for 45 minutes. For the purposes of this invention it is important not to introduce extraneous diluents that would lower the final solids content of the coating. The hexamethoxymethylmelamines also offer fast rates and high efficiency of cure and result in coatings of high gloss and excellent chemical and stain resistance.

The polyisocyanates that can be utilized to crosslink or extend the hydroxy-terminated polyester blend are also well known. Among the preferred ones are included: the biuret of hexamethylene diisocyanate and various prepolymers of isophorone diisocyanate and methylene bis(cyclohexylisocyanate). Diisocyanates can also be utilized.

A preferred composition contains a polyester blend of TMPD/IPA and TMPD/aliphatic in an approximate weight ratio of 65:35, 55-75 parts, and a crosslinking agent, 45-25 parts. For optimum properties in a final coating for use in the appliance industry, 65 parts of the above blend is preferred together with 35 parts of a nitrogen resin crosslinking agent. It is understood that, in addition to the above components, the final coating composition can contain a variety of additives and modifiers.

The coating composition of this invention can be cured to a tough, flexible coating upon heating in the absence or presence of additional catalyst. The use of acidic catalysts to cure coating compositions based on hydroxy-functional polyesters and complementary crosslinkers is well known in the art, para-toluenesulfonic acid (PTSA) being a commonly used catalyst.

The amount and type of acid catalyst can depend, among other factors, on the amount and type of crosslinking agent utilized in the coating composition of this invention, on the desired curing temperature and time or on the method of application of the coating composition. For example, it was found that utilizing 20 parts by weight of a melamine-formaldehyde crosslinker with 80 parts of the hydroxy-terminated polyester blend of this invention required 0.4 part by weight of PTSA, while a 35/65 ratio of the same materials required approximately 0.5 part by weight of PTSA to achieve the same approximate level of curing.

The method of application of the coating composition can affect the catalyst level when electrostatic spray application is utilized. For this application it is important that the coating composition have high resistivity. As can be seen from the data below, increasing the level of catalyst, which allows a higher rate of cure or curing at a lower temperature, decreases the resistivity of the composition as measured by a Ransburg Resistivity Meter having a pre-set gap between the electrodes and thereby providing relative resistivity values in megaohms. The pigmented coating composition utilized in this test is based on a polyester blend containing a polyester prepared from TMPD and IPA and a polyester prepared from TMPD and dimethyl aliphatic carboxylates (succinate: glutarate: adipate in a 1:2:1 approximate weight ratio), in a weight ratio of approximately 1:4, and hexamethoxymethylmelamine, in a weight ratio of polyesters:crosslinker of approximately 2:1, measurements are at 25° C.:

| Catalyst Level (%) | Relative Resistivity (Megaohm) |
|---|---|
| 0 | 10 |
| 0.20 | 3.8 |
| 0.25 | 1.9 |
| 0.30 | 1.75 |
| 0.35 | 1.4 |
| 0.40 | 1.2 |

Curing of the coating composition of this invention can be carried out at various temperatures, usually between 125°-180° C. and preferably between 150°-175° C. The length of time of curing can also vary but 20-30 minutes afford well cured coatings.

The coating composition of this invention can contain, in addition to a blend of polyesters and a crosslinking agent, other components to enhance various properties of the composition or the final coating therefrom, such as pigments, pigment stabilizers, rheology control agents, for example acrylic polymers, cellulosics, finely divided fumed silicas, dispersants, adhesion promoting agents, e.g. epoxy resins, colorants, and the like.

For purposes of this invention, the coating composition can be prepared from the polyester blends followed by the addition of the other ingredients or by premixing the ingredients with each of the polyester components followed by blending.

The coating compositions of this invention are designed for application to metallic substrates, such as steel and aluminum and can be applied with or without the presence of a primer. They can be applied by any conventional method of application such as spray-, dip-, roll- or brush-coating or by electrostatic methods. In this latter case, high resistivity of the coating composition is an important factor.

The coating composition of this invention are useful as general industrial coatings, for example in the appliance industry, and provide coatings having excellent solvent and stain resistance, resistance to weathering and corrosive conditions, forward and reverse impact, hardness, high gloss, etc.

In the following Examples, illustrating the invention, all parts are by weight, unless otherwise indicated.

EXAMPLE I

A. Preparation of a Polyester from 2,2,4-Trimethylpentane-1,3-diol and Isophthalic acid Into a five liter three-necked flask equipped with stirrer, thermometer, a packed column, condenser, and a Dean-Stark trap are placed TMPD, 1839.6 g; isophthalic acid, 996.0 g; toluene, 54.0 g; and dibutyltin dilaurate, 3.0 g. The contents of the flask are heated to a maximum temperature of 208° C. for a total of eleven hours during which time a water-toluene azeotrope is collected to remove the theoretical amount of water. The final product has a solids content of 98% in toluene, a viscosity of 32,750 centipoises, measured on a Brookfield viscometer, and an acid number of 5.4.

B. Preparation of a Polyester from 2,2,4-Trimethylpentane-1,3-diol and a Mixture of Dimethyl aliphatic carboxylates Into an apparatus described in A above are charged TMPD, 1839.6 g; a mixture of dimethyl succinate, dimethyl glutarate, and dimethyl adipate, in a weight ratio of 1:2:1, 972.0 g; and dibutyltin dilaurate, 3 g. The contents of the vessel are heated to a maximum of 202° C. for a total of nine hours during which time the theoretical amount of methanol is collected. The final product has a Gardner-Holdt viscosity of Q and a hydroxyl number of 213.

C. Preparation of a Polyester Blend

A blend of polyesters is prepared by stirring together 80 g of the polyester from A above and 20 g of the polyester from B above.

D. Preparation of a Copolyester Control

Utilizing the apparatus described in A above, the following components are placed in the reaction vessel: TMPD, 1839.6; dimethyl isophthalate, 931.2 g; the mixed methyl esters of the aliphatic carboxylic acids shown in B above, 194.4 g; and dibutyltin dilaurate, 3 g. The contents are heated at a maximum temperature of 196° C. for 7.5 hours to remove the theoretical amount of methanol.

EXAMPLE II

A. Pigment Dispersion

A pigment dispersion is prepared from the following ingredients, by sand milling:

| | |
|---|---|
| Hexamethoxymethylmelamine | 463.0 g. |
| Acrylic rheology control agent, at 60% solids, composition: butyl acrylate/styrene/hydroxyethyl acrylate/acrylic acid//38/50/8/4, solvent composition:cellosolve acetate/n-butanol/aliphatic hydrocarbon//61/8/31 | 234.9 g. |
| Dispersant, at 48% solids, an isocyanate-modified methyl methacrylate/2-ethylhexyl acrylate//63/37 polymer, capped with mercaptosuccinic acid; described in Canadian Patent 968,092, Example I | 9.1 g. |
| Amyl acetate | 279.5 g. |
| TiO$_2$ (rutile) | 2013.4 g. |

B. Coating Composition Based on Polyester Blend from Exmple IC

A coating composition is prepared by mixing together the following:

| | |
|---|---|
| Pigment dispersion from A above | 400.0 g. |
| Polyester Blend from Example IC | 172.0 g. |
| Hexamethoxymethylmelamine | 18.8 g. |
| Toluene | 12.0 g. |
| PTSA (20% in isopropanol) | 2.6 g. |

C. Coating Composition Based on a Copolyester Control from Example ID

A coating composition is prepared by mixing together the following:

| | |
|---|---|
| Pigment dispersion from A above | 400.0 g. |
| Copolyester Control from Example ID | 169.1 g. |
| Hexamethoxymethylmelamine | 18.8 g. |
| Toluene | 12.0 g. |
| PTSA (20% in isopropanol) | 2.6 g. |

D. Preparation of Coatings

The compositions from B and C above are applied to cold-rolled steel panels, treated with an iron phosphate conversion coating, by spraying and are cured at 163° C. for 30 min. The tabulation below shows that the coating composition of this invention has excellent stain and solvent resistance while the control fails to meet minimum requirements.

| Test | Coating Composition Based On: | |
|---|---|---|
| | B | C (control) |
| Pencil hardness | 4H | 2H |
| Solvent resistance (as measured by pencil hardness testing immediately after 50 double rubs with methyl ethyl ketone) | 4H | F |
| Direct impact resistance | | |
| 30 inch pound | 10 | 10 |
| 40 inch pound | 10 | 9.5 (some cracking) |
| 50 inch pound | 10 | 9.5 (some cracking) |

| | Coating Composition Based On: | |
|---|---|---|
| Test | B | C (control) |
| Reverse impact resistance | | |
| 30 inch pound | 9.0 | 9.0 |
| 40 inch pound | 9.0 | 8.5 (cracking, delamination) |
| 50 inch pound | 8.5 | 8.5 (cracking, delamination) |
| Stain resistance[1] | | |
| mustard | 10 | 9 |
| lipstick | 10 | 9 |
| orange dye | 10 | 8 |

[1]Test carried out by placing staining agent on coating for a 72-hour period, followed by washing with soap and water. The coating is rated immediately after the washing. A value of 10 indicates no effect by the staining agent. Minimum acceptable value for most applications is 9.5.

EXAMPLE III

A. Preparation of a Polyester from Neopentyl Glycol and Iso-phthalic Acid - Control The procedure of Example IA is repeated, substituting neopentyl glycol (NPG) for TMPD. The final product is a semi-solid at room temperature.

B. Preparation of a Polyester from Neopentyl Glycol and a Mixture of Dimethyl aliphatic carboxylates - Control The procedure of Example IB is repeated, substituting neopentyl glycol for TMPD. The final product is quite viscous and crystals are deposited upon standing at room temperature.

C. Coating Composition Based on Control Polyester A

A coating composition is prepared by mixing together the pigment dispersion from Example IIA, 2643.0; the NPG - based polyester from A above, 1078.0 g.; an epoxy resin (available from Shell Chemical Co. as Epon 828), 71.0 g. hexamethoxymethyl melamine, 124.1 g., and amyl acetate, 83.4 g. The final volume solids is 80%.

D. Coating Composition Based on Control Polyester B

A coating composition is prepared as above but substituting the NPG-based polyester prepared in (B) above. The final volume solids is 80%.

E. Comparison of Control Coating Compositions from C and D above with Coating Compositions Based on Polyesters from Example IA and B Coating compositions based on polyesters from Example IA and (B) are prepared as in (C) above utilizing the individual polyester components from Example IA and IB. A comparison of these coating compositions, at 80% volume solids, with the control compositions prepared in (C) and (D) above, at the same volume solids, shows that the latter are very viscous and thereafter are unsuitable, when blended, as high solids coating compositions in most applications:

| | Viscosity (cps, Brookfield, 2 rpm, 32° C.) |
|---|---|
| TMPD/IPA-based (Ex. IIIE) | 580 (#3 spindle) |
| NPG/IPA-based (control, Ex. IIIC) | 2750 (#3 spindle) |
| TMPD/aliphatic diesters (Ex. IIIE) | 180 (#1 spindle) |
| NPG/aliphatic diesters (control, Ex. IIID) | 310 (#1 spindle) |

I claim:

1. A polyester blend consisting essentially of:
(A) 10-90 parts by weight, based on the weight of the blend, of a polyester of the following structure:

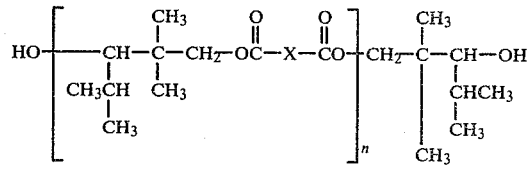

its isomer through the secondary hydroxyl group or mixtures thereof, wherein X=—CH=CH—,

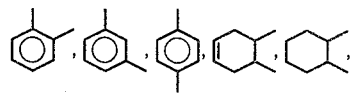

and wherein n=0-10 and at least 70% by weight is n=3 or less provided that only a maximum of 25% by weight of n=0;

(B) 90-10 parts by weight, based on the weight of the blend, of a polyester of the following structure:

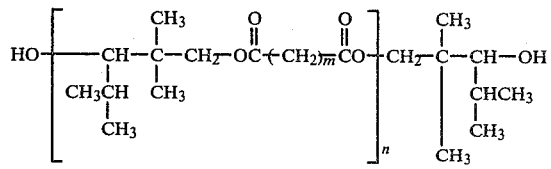

its isomer through the secondary hydroxyl group or mixtures thereof, where n=0-10 and at least 65% by weight is n=3 or less and wherein m=2-12; and wherein polyesters (A) and (B) have a number average molecular weight not exceeding 1,000 determined by gel permeation chromatography using a polypropylene glycol standard.

2. The polyester blend of claim 1 wherein X is

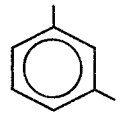

and m=2-4.

3. The polyester blend of claim 2 wherein said component (A) is based on isophthalic acid and said component (B) is based on a mixture of succinic, glutaric, and adipic acids in an approximate weight ratio of 1:2:1.

4. The polyester blend of claim 3 wherein said component (A) is 40-80 parts by weight of the blend and said component (B) is 60-20 parts by weight of the blend.

5. A high solids coating composition consisting essentially of:
   (1) 30–80 parts by weight, based on the weight of (1) plus (2), of the polyester blend of claim 1 and
   (2) 70–20 parts by weight of crosslinking agent of an alkylated amine-aldehyde resin, an alkylated amide aldehyde resin or mixtures thereof or a polyisocyanate.
6. The coating composition of claim 5 wherein X=

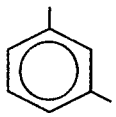

and m=2–4.

7. The coating composition of claim 6 consisting essentially of 55–75 parts by weight of said polyester blend and 45–25 parts by weight of said crosslinking agent.

8. The coating composition of claim 7 additionally containing pigment, rheology control agent, adhesion promoting agent, dispersant, and catalyst.

9. A coating composition comprising
   (A) 55–75 parts by weight, based on the weight of (A) plus (B), of a polyester blend consisting essentially of
   (1) 40–80 parts by weight, based on the weight of the blend, of a polyester of the following structure:

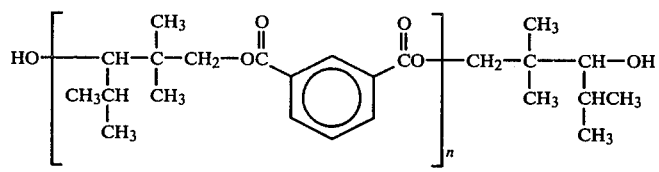

its isomer through the secondary hydroxyl group or mixtures thereof, wherein n=0–10 and at least 65% by weight is n=3 or less; and
   (2) 60–20 parts by weight, based on the weight of the blend, of a polyester of the following structure:

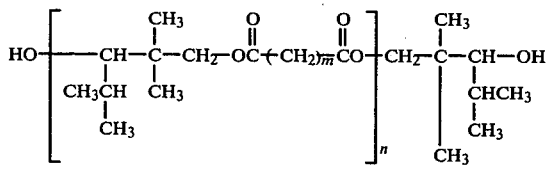

its isomer through the secondary hydroxyl group or mixtures thereof, wherein n=0–10 and at least 65% by weight is n=3 or less; and wherein m=2–4 and
   (B) 45–25 parts by weight, based on the weight of (A) plus (B), of a crosslinking agent of an alkylated amine aldehyde resin, an alkylated amide aldehyde resin or mixtures thereof.

10. The coating composition of claim 9 comprising
    (A) 65 parts by weight, based on the weight of (A) plus (B), of the polyester blend and (B) 35 parts by weight, based on the weight of (A) plus (B), of a crosslinking agent of an alkylated amine aldehyde resin.

11. A high solids pigmented coating composition prepared from a blend of an ester diol as film-former and a curing agent for the film-former, characterized in that
    (1) the ester diol is a mixture of
       (a) 20–80 weight % of an ester diol having the general formula:

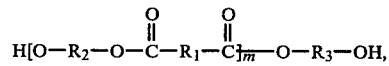

where $R_1$ represents the group formed by abstraction of the carboxyl groups from a cycloaliphatic and/or aromatic dicarboxylic acid selected from the group consisting of phthalic, isophthalic, terephthalic, tetrahydrophthalic, cyclohexane -1,2-dicarboxylic acid, and the isomeric naphthalene dicarboxylic acids and $R_2$ and $R_3$ are the same and represent groups formed by abstraction of the two hydroxyl groups from the divalent alcohol 2,2,4-trimethyl-1,3-pentane diol, and m is a number of 1–3, and
       (b) 80–20 weight % of an ester diol having the general formula:

where $R_4$ represents the group formed by abstraction of the two carboxyl groups from an aliphatic dicarboxylic acid having the formula $HOOC\text{-}(CH_2)_z\text{-}COOH$ wherein Z is 1–12, and $R_5$ and $R_6$ are the same and represent groups formed by the abstraction of the two hydroxyl groups from the divalent alcohol 2,2,4-trimethyl-1,3-pentane diol, and n is a number of 1–3,
    (2) the curing agent for the film former is an alkylated product of an amino resin, and
    (3) the amount of pigment in said coating composition is about 50%, by weight, based on the solids content.

12. The coating composition of claim 11 characterized in that the weight ratio of ester diol (a) to ester diol (b) is from 80:20 to 40:60.

13. The coating composition of claim 11 characterized in that one of the ester diols is formed from a cycloaliphatic or aromatic dicarboxylic acid or its esters wherein the acid is selected from the group consisting of phthalic, isophthalic, terephthalic, tetrahydrophthalic, and cyclohexane -1,2-dicarboxylic acid and the diol 2,2,4-trimethyl-1,3-pentane diol.

14. The coating composition of claim 11 characterized in that one of the ester diols is formed from an aliphatic dicarboxylic acid or its esters, the acid having the formula HOOC-$(CH_2)_z$-COOH wherein Z is 2-4, and the diol 2,2,4-trimethyl-1,3 pentane diol.

15. The coating composition of claim 11 characterized in that the molar ratio of the hydroxyl groups of the ester diol mixture to the reactive groups of the curing agent is about 0.66.

16. The process for the preparation of a coating composition having a high solids content characterized in that it comprises the preparation of the coating composition of claim 11.

17. The coating composition of claim 11 wherein said curing agent for the film-former is a methylol melamine containing 6 methylol groups per molecule of melamine, all of said methylol groups being etherified with methanol.

18. The coating composition of claim 11 wherein said curing agent for the film-former is an N-methylol group-containing amino resin formed by reacting an aldehyde with a compound containing amino groups or amido groups.

* * * * *